No. 803,796. PATENTED NOV. 7, 1905.
C. F. STREIGHT.
FRUIT CLIPPER.
APPLICATION FILED APR. 6, 1905.
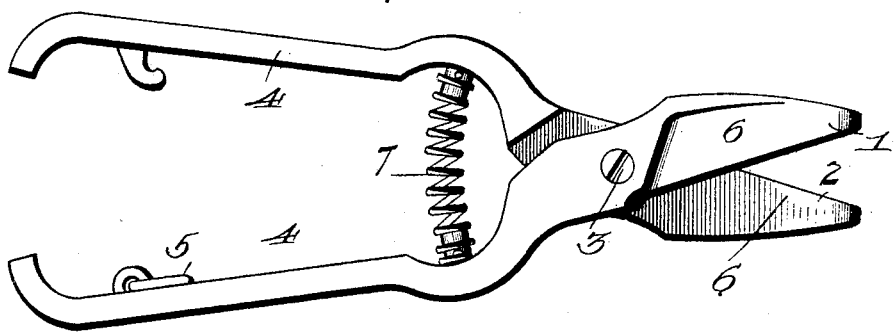
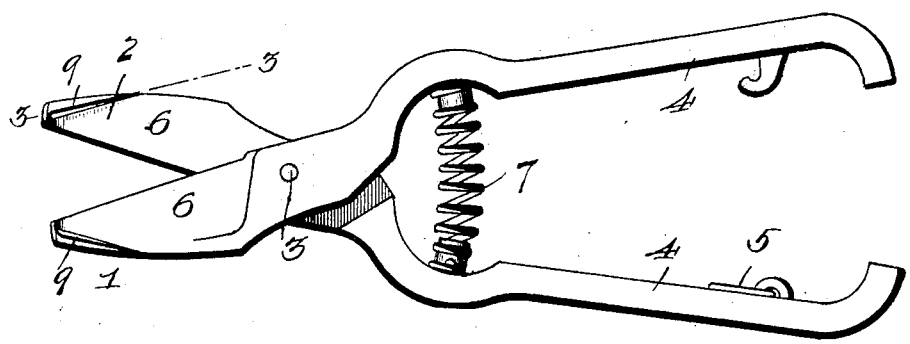
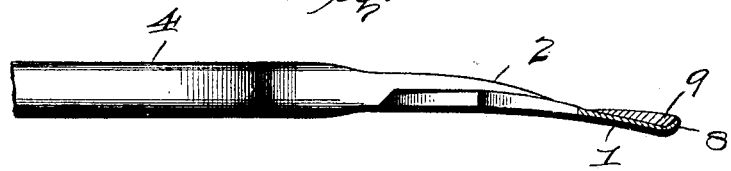
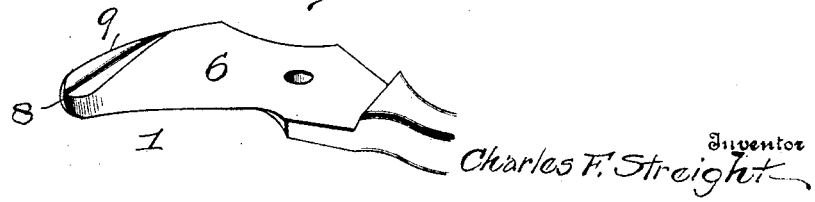
Witnesses
Charles F. Streight, Inventor
By D. P. Wolhaupter, Attorney

UNITED STATES PATENT OFFICE.

CHARLES F. STREIGHT, OF RIVERSIDE, CALIFORNIA.

FRUIT-CLIPPER.

No. 803,796.     Specification of Letters Patent.     Patented Nov. 7, 1905.

Application filed April 6, 1905. Serial No. 254,155.

To all whom it may concern:

Be it known that I, CHARLES F. STREIGHT, a citizen of the United States, residing at Riverside, in the county of Riverside and State of California, have invented certain new and useful Improvements in Fruit-Clippers, of which the following is a specification.

This invention relates to that class of pruning implements known as "fruit-clippers," and has special reference to a device of this character possessing special utility for clipping and picking citrus fruit.

To this end the invention contemplates a fruit-clipper in the form of a pair of hand-shears and embodying a simple and practical improvement which permits the close clipping of the stem of the fruit when picked from the tree, so that during the operation of picking the fruit there will be no projecting stem to perforate other fruit in the same box, which is a common cause of injury to the fruit. This injury results from the use of pointed shears, which are often very carelessly handled by the picker. Frequently a careless picker not only fails to cut the stem close enough to the fruit, but oftentimes inserts the sharp points of the shears into the skin of the fruit to cut the stem short.

The present invention is intended to overcome the above objections to the use of the ordinary sharp-pointed fruit-clipping shears by providing a construction which permits a close clipping of the stem without puncturing the skin of the fruit by the points of the shears in the cutting operation. Furthermore, the improvement contemplated by the invention permits the fruit to be directed into the picking-sack without being perforated by the shear-points and also prevents the shears from catching on limbs and twigs of the tree in the act of withdrawing them.

With these and other objects in view, which will more readily appear as the nature of the invention is better understood, the same consists in the novel construction, combination, and arrangement of parts which will be hereinafter more fully described, illustrated, and claimed.

Figure 1 is a front elevation of a fruit-clipper embodying the present invention and shown in its normal spring-opened position. Fig. 2 is a rear elevation of the clipper. Fig. 3 is a sectional view on the line 3 3 of Fig. 2. Fig. 4 is an enlarged detail in perspective of the blade end of one of the shear members.

Like reference-numbers designate corresponding parts in the several figures of the drawings.

In carrying out the invention the implement in its general form resembles an ordinary type of fruit-clipping hand-shears essentially consisting of a pair of pivotally-connected shear members 1 and 2, arranged in intersecting relation and united at their point of crossing by the pivot or scissors-joint 3, and at one side of the pivot 3 the shear members 1 and 2 are extended into the usual handles 4, which are designed to be temporarily held together in closed relation by the releasable link-fastening 5, which is employed when the clipper is not in use. At the opposite side of the pivot from the handles 4 the shear members are provided with the flat cutting-blades 6, the beveled cutting edges of which are arranged in overlapping relation, so that in the act of cutting one blade works over the other, and thus produces a shearing cut. The said blades 6 (when the link-fastening 5 is released) are normally held open through the medium of the separating-spring 7, interposed between the handles 4. The flat blades 6 are curved in the direction of their length, and a distinctive feature of the present invention resides in having the tip end of each blade bent or deflected rearwardly on a curved line, as indicated at 8, to produce a curved blunt nose.

A further feature of the invention consists in providing a guard or filling lug 9, arranged on the back side of each blade and partially filling the concavity at the rear side of and beyond said deflected tip or nose 8. As plainly shown in the sectional view Fig. 3 of the drawings, the guard-lug 9 is of a triangular form in longitudinal section, and the outer surface thereof merges into the outer surface of the nose 8 and also into the rear face of the blade, thus providing a guard which positively prevents the shear-points catching on the limbs or twigs of the tree in the act of withdrawing the same. The guard-lug 9 extends along the outer edges of the blades 6, thus leaving the inner edges of the noses 8 unobstructed for cutting purposes and permitting one nose to close in behind the other. This construction permits of a very close clipping of the stem, while at the same time possessing the other advantages herein pointed out.

Having thus described the invention, what is claimed, and desired to be secured by Letters Patent, is—

1. A fruit-clipper comprising a pair of pivotally-connected shear members provided at one side of the pivot with cutting-blades, each having a rearwardly-deflected tip to produce a blunt nose.

2. A fruit-clipper comprising a pair of pivotally-connected shear members provided at one side of the pivot with cutting-blades, each blade having a rearwardly-deflected tip producing a blunt nose, and a guard-lug arranged on the back side of the blade and lying in the concavity at the rear side of and beyond the deflected tip.

3. A fruit-clipper comprising a pair of pivotally-connected shear members provided at one side of the pivot with cutting-blades, each blade having its tip bent or deflected rearwardly on a curved line to produce a curved blunt nose, and a guard-lug arranged on the back side of the blade and partially filling the concavity at the rear side of and beyond the deflected tip, said guard-lug having its outer surface merging into the outer surface of the nose, and also into the rear face of the blade.

In testimony whereof I affix my signature in presence of two witnesses.

CHARLES F. STREIGHT.

Witnesses:
WILLIAM G. IRVING,
G. C. DENNIS.